United States Patent Office 3,445,436
Patented May 20, 1969

3,445,436
POLYURETHANE POLYEPOXIDES
Clarence L. Lake, Cleveland Heights, Larry R. Barron, Euclid, and Robert H. Faud, Lyndhurst, Ohio, assignors to The Tremco Manufacturing Company, Cleveland, Ohio, a corporation of Ohio
No Drawing. Filed June 14, 1966, Ser. No. 557,362
Int. Cl. C08g *22/04, 30/00*
U.S. Cl. 260—75                    15 Claims

ABSTRACT OF THE DISCLOSURE

A polyurethane polyepoxide formed by reacting an organic polyisocyanate with a triol or a mixture of a triol and diol, the mixture having a hydroxyl functionality in excess of 2.3, to form a liquid, isocyanate terminated polyurethane prepolymer; and reacting the prepolymer with a hydroxy aliphatic epoxide compound, or a precursor capable of undergoing epoxidation in situ, or mixtures thereof, to form a polyurethane polyepoxide having a functionality in excess of 2, consisting of epoxy groups.

---

The present invention relates to polyurethane polyepoxides and more particularly to polyurethane polyepoxide sealant materials prepared from organic triols that can be formed conveniently in place as viscous easily applied liquid polymers and cured in situ to solid, highly extensible and weather resistant elastomers.

In the past, the use of polyurethane polyepoxide as, for instance, sealants, has suffered from the drawback that such workable polymers have too high a modulus, contain too much solvent, have poor package stability, are dark in color, require either excessive room temperature cure time or elevated cure temperatures. It is desirable, however, for polymers that are used for sealants to have a workable consistency when mixed with a curing agent and applied on the job. It is also desirable that such consistency be maintained up to an end point where the polymer becomes a firm elastic material. In addition, it is highly desirable for the polymer-curing agent mixtures to have a reasonably long pot life at ambient temperature so that it can be applied on the job without setting up in the container. Hence, it is also highly desirable to have some control of the length of the pot life of the system. The usually desirable pot life of 6–8 hours at room temperature is readily obtained. However, pot lives are easily controlled to considerably shorter time, i.e. 6, 4, 2 hours or less or considerably longer pot lives, i.e. of 24, 48 hours or longer, if so desired.

Therefore, it is an object of the present invention to provide a stable polyurethane polyepoxide that can be applied as a liquid sealant material having a controllable pot life at ambient temperatures which cures to a solid elastomer.

It is an object of the present invention to provide a polyurethane polyepoxide made from an organic triol starting material and a method of making the same.

It is the object of the present invention to provide a composition that is easy to apply as a two-part sealant material and is curable to a recoverable elastomer, the composition comprising a polyurethane polyepoxide made from polyether and/or polyester triol and a curing agent for the polyepoxide.

It is an object of the present invention to provide a polyurethane polyepoxide that is characterized by excellent stability at room temperature and also having good stability at temperatures of 80° C. or higher as indicated by only minor changes in viscosity. The resultant polyepoxide also has a sufficiently long pot life at ambient temperatures and can be applied on the job without setting up in the container. Furthermore, the workability of the material at 100% solids is excellent.

Other objects will become apparent from the specification that follows and from the appended claims.

The present invention provides a new polyurethane polyepoxide that is easily applied as a viscous liquid sealant material and is curable to a recoverable elastomer, the polyepoxide having a controllable pot life at ambient temperatures, and having the desired workability during its early stages of cure, after which the material also desirably converts to a firm elastomeric polymer with satisfactory adhesion to various substrates such as wood, metal, stone, porcelain, concrete, etc.

These novel polyurethane polyepoxides are made from a polyester or polyether triol starting material having an average molecular weight range of preferably about 1000 to 7000 with the best results being obtained at about 4200 to 6500.

The triol can be blended with some diol material, such diol preferably having an average molecular weight of at least about 3800 and, better still, at least 4200. However, the more triol hydroxyl equivalents that are used, the tougher and more recoverable will be the final cured elastomer product. Hence, an OH functionality greater than 2 is highly desirable and it is preferred that no diol material be used inasmuch as the triol provides a polymer in which the properties, i.e. viscosity, package stability, pot life, etc. are controllable over a wider range.

The triol provides a means of controlling the functionality of the liquid polymer and the crosslinked density of the elastomer. Also the triol provides an elastomer in which the properties, i.e. modulus, elongation, recovery, firmness, etc. are controllable over a wider range.

Suitable polyether triols are polyethylene ether triol, polypropylene ether triol and polybutylene ether triol, etc. When used, suitable diols are polyethylene ether glycol, polypropylene ether glycol, and polybutylene ether glycol, etc.

Suitable polyesters have an average molecular weight of about 1000 to 7000 and include any hydroxyl terminated polyester prepared from a mixture of poly-basic acids or anhydrides and polyols in which the hydroxyl functionality of the polyester prepolymer is greater than 2, preferably over 2.3.

Suitable polyisocyanates for reaction with the polyol, having a functionality greater than 2 (preferably over 2.3), are organic polyisocyanates having 2 or more isocyanate groups and preferably 2 groups or mixtures thereof. Suitable polyisocyanates are p,p',p''-triisocyanato triphenyl methane, p,p'-diisocyanato diphenyl methane, hexamethylene diisocyanate, or mixtures thereof, and preferably a mixture of 2,4- and 2,6-tolylene diisocyanates.

A liquid polyurethane prepolymer material is formed by the reaction of the above described polyol materials and a polyisocyanate. The liquid prepolymer is then reacted with glycidol or a 2-alkyl glycidol such as 2-methyl glycidol and 2-ethyl glycidol to form a viscous liquid polyurethane polyepoxide that is further curable at room temperature to an elastomer. The liquid prepolymer can be advantageously capped with a monofunctional active hydrogen containing material that is preferably a monofunctional hydroxyl containing compound such as an alkanol including methanol, ethanol, etc. The prepolymer thus can have an average functionality of 2 or more reactive end groups; the remaining are capped with the alkanol prior to or simultaneously with the reaction with glycidol or a material such as an alkylene glycol acrylate that can be epoxidized in situ.

The hydroxylated material containing an aliphatic epoxide group, used for reaction with the polyurethane prepolymer to form the liquid polyepoxide is preferably glycidol but can be a 2-alkyl glycidol where the alkyl group has 1–4 carbon atoms, or any other organic compound containing an hydroxyl and an epoxide group.

The glycidol can also be replaced by a compound containing an active hydrogen and unsaturation capable of being epoxidized in situ, such as an alkylene glycol monoacrylate or monomethacrylate including propylene glycol monoacrylate or ethylene glycol monomethacrylate.

The polyurethane polyepoxide can be cured to an elastomer by mixing the liquid polyepoxide with a curing agent such as liquid organic polyamine including triethylene tetramine, propylene diamine, or a polyamide polyamine or organic acids or anhydrides such as alkendic anhydride, dodecyl succinic anhydride and azelaic acid.

The resultant composition comprising a triol polyisocyanate polyepoxide and diamine curing agent provides a sealant with a controllable pot life at ambient temperatures which was previously not available. In addition, when properly formulated, a sealant is provided that can easily be applied on the job, the material having a relatively low consistency up to a point where it desirably cures to a solid elastic material. The whole combination of highly desirable properties is controllable within broad limits.

The polyepoxides can be filled with carbon black, talc, calcium carbonate, silica, etc. The resultant filled and cured polyepoxides have excellent adhesion to substrates such as concrete, glass, aluminum, steel, etc. without the use of primers, which is highly important in sealant application.

The following examples are intended to illustrate the present invention and not to limit the same in any way:

Example 1

From 918 parts by weight (0.15 mole, 0.45 OH functional equivalents) of polypropylene ether triol having an average molecular weight of 6100, 75 parts by weight of toluene is vacuum distilled to 125° C. and 10 mm. of mercury, the resulting triol being free of moisture. After cooling the triol to 60° C. with stirring under nitrogen 2.3 parts of 2,6-ditertiary butyl p-cresol and 78 parts (0.45 mole, 0.90 NCO functional equivalents) of a 80/20% by weight mixture of 2,4- and 2,6-tolylene disocyanates was added.

The resultant mixture was heated to 90° C. and held there for 2½ hours. Thereafter, 33.3 parts by weight (0.45 mole, 0.45 OH functional equivalents) of glycidol was added and the reaction mixture was heated to 120° C. and held there for four hours.

The resultant reaction product was a polyurethane polyepoxide having an epoxide equivalent weight of about 2300. The product exhibited 100% epoxidation for the system and was a water white, clear, viscous liquid.

The polyepoxide product was cured to an elastomer by mixing therewith 0.8 part by weight of propylene diamine per 50 parts of the polyepoxide. A flexible elastic material was obtained by curing at a relatively low temperature of 4° C. An elastomeric material was also obtained by curing at 66° C. for a much shorter time, without essentially altering the properties of the elastomeric material.

Example 2

Seventy-five parts of toluene was vacuum distilled to 125° C. and 10 mm. mercury, from 918 parts by weight (0.15 mole, 0.45 OH functional equivalents) of polypropylene ether triol having an average molecular weight of about 6100, which freed the system of moisture. Upon cooling the triol to 60° C. with stirring under nitrogen 9.2 parts by weight of N,N'-bis (1–4 dimethyl pentyl) paraphenylene diamine by weight and 78 parts (0.45 mole, 0.90 NCO functional equivalents) of an 80–20% by weight mixture of 2,4- and 2,6-tolylene diisocyanate was added to the triol material. The triol-diisocyanate mixture was heated at 90° C. for 2 hours after which 25.3 parts (.338 mole) of glycidol and 8.5 parts (.112 mole) anhydrous isobutanol (0.45 total OH functional equivalents) was added and the mixture was held at 120° to 125° C. for four hours to form a polyurethane polyepoxide.

The resultant polyepoxide has an epoxide equivalent weight of about 3000 and an epoxy content of approximately 75% of the maximum for the system. It is a clear, viscous liquid having excellent stability.

The polyurethane polyepoxide was cured using 1.2 parts of triethylene tetramine per 50 parts of the polymer to provide an elastomeric material.

Example 3

With stirring under nitrogen, 250 parts of toluene and 917 parts (0.15 mole, 0.45 OH functional equivalents) of polypropylene ether triol having an average molecular weight of about 6100 were refluxed for 30 minutes and the water driven off collected in a Dean-Stark trap. The refluxed mixture was cooled to 35° C. and 2.5 parts of dibutyl tin dilaurate added thereto. Over a 5 to 15 minute period, 80 parts (0.45 mole, 0.90 NCO functional equivalents) of an 80–20 mixture of 2,4- and 2,6-tolylene diisocyanate was added thereto. The resultant mixture was reacted at 50° to 60° C. for one hour, then at 80° to 85° C. for one half hour to form an isocyanate terminated polyurethane prepolymer. 59 parts (0.45 mole, 0.45 OH functional equivalents) of propylene glycol monoacrylate was added to the polyurethane prepolymer material and reacted therewith at 90° C. for one hour. The solvent was removed by vacuum distilling to 130° C. and 20 mm. mercury, leaving a prepolymer with terminal unsaturation.

The prepolymer was cooled to 50° C. and 200 parts of n-hexane, 13.5 parts of acetic acid, and 1.9 parts of 50% sulfuric acid were added thereto. 33.6 parts of 50% hydrogen peroxide was added dropwise over a two hour period and thereafter the mixture was held at 60° C. for ten hours.

The final mixture resulting from the above steps was washed with successive portions of water until freed of acid. The remaining water and solvent was removed by vacuum distillation.

The resultant polymer was a clear, viscous polyurethane polyepoxide which was cured to an elastomer by adding 1.5 parts of triethylene tetramine to 50 parts by weight of the polymer. The polymer was formulated to a sealant material having outstanding properties.

Example 4

Starting with the same basic raw materials used in Example 1, with the exception that the mixture of tolylene diisocyanates was replaced with hexamethylene diisocyanate, a polyurethane polyepoxide having an average molecular weight of about 6900 was prepared by the method described in Example 1.

The polyepoxide was cured by mixing 1.6 parts of triethylene tetramine with 50 parts of the polymer and cured to an elastomer after standing at room temperature for one week.

Example 5

Starting with a polypropylene ether triol of about 1600 molecular weight, a polyurethane polyepoxide was prepared by the method described in Example 2.

To 100 parts of the polyepoxide 15 parts of xylene was added and the resultant solution was cured by adding 7.0 parts of triethylene tetramine. After standing overnight at room temperature, the product was a well-cured and tack free elastomer with good sealant properties.

Example 6

918 parts (0.15 mole, 0.45 OH functional equivalents) of a 6100 molecular weight triol was freed of moisture by vacuum distilling from it 75 parts of toluene. After cooling to 60° C., with stirring and under nitrogen, 2.3 parts of 2,6 ditertiary butyl-p-cresol and 65.2 parts (0.375 mole, 0.75 NCO functional equivalents) of an 80–20 mixture of 2,4- and 2,6-tolylene diisocyanate was added. The mixture was held at 90° C. for 2½ hours after which 22.2 parts (0.3 mole, 0.3 OH functional equivalents) of glycidol was added. This mixture was then held at 125° C. for four hours.

The resultant polyurethane polyepoxide had a molecular weight of about 13,500 and was a clear, water white, viscous, but workable liquid which contained 4 functional epoxide groups per molecule.

The polyepoxide was cured by mixing 1.1 parts of triethylene tetramine with 50 parts of the polymer, and allowing it to stand overnight at room temperature.

Example 7

A polyurethane polyepoxide was prepared by the method described in Example 1 except that the 80/20 mixture of 2,4- and 2,6-tolylene diisocyanate was replaced by diphenylmethane 4,4-diisocyanate.

The resultant polyurethane polyepoxide was a clear, water white, viscous liquid which exhibited essentially the same properties as Example 1 when cured with the same polyamine.

Example 8

150 parts of xylene, 169 parts of azelaic acid, 69 parts trimellitic anhydride and 537 parts of ricinoleyl alcohol were heated to reflux with stirring under nitrogen. The mixture was refluxed for 15 hours with the water of reaction collected in a Dean-Stark trap. The solvent was removed by vacuum distillation, and after cooling to 50° C., 131 parts of an 80/20 mixture of 2,4- and 2,6-tolylene diisocyanate was added. The mixture was held at 90° C. for 2 hours, after which 55.5 parts of glycidol was added. The mixture was heated to 120° C. and held there for four hours.

The resultant polyester polyurethane polyepoxide is a clear, light amber, viscous liquid of about 2925 molecular weight. When cured with triethylene tetramine it becomes a soft, slightly tacky elastomer.

It is to be understood that, in accordance with the provisions of the patent statutes, the particular compositions set forth and described and the particular procedures set forth are presented for the purposes of explanation and modifications of said compositions and procedures can be made without departing from the spirit and scope of the invention.

What is claimed is:

1. A polyurethane polyepoxide that is the reaction product of
   (1) a polyurethane prepolymer prepared by reacting
      (a) a material selected from the group consisting of polyether triols, polyester triols, and admixtures of the foregoing with polyether diols and polyester diols, said material having a hydroxyl functionality in excess of 2.3 and an average molecular weight within the range of about 1000 to about 7000, and
      (b) an organic polyisocyanate, the proportion of reactants (a) and (b) being such as to provide an excess of isocyanate groups sufficient to produce a liquid, isocyanate-terminated polyurethane prepolymer, and
   (2) a reactant selected from the group consisting of hydroxy aliphatic epoxide compounds, compounds containing an active hydrogen and aliphatic unsaturation capable of undergoing epoxidation in situ, and admixtures of the foregoing with monohydric alcohols, said polyurethane polyepoxide having a functionality in excess of 2, consisting of epoxy groups.

2. The polyurethane polyepoxide is defined in claim 1 wherein reactant (2) is selected from the group consisting of glycidol and 2-alkyl glycidols wherein said alkyl has 1–4 carbon atoms.

3. The polyurethane polyepoxide as defined in claim 1 in which material (a) is a polypropylene ether triol having an average molecular weight within the range of about 4200 to about 6500, and the polyisocyanate is a mixture of 2,4- and 2,6-tolylene diisocyanate.

4. A process for making a polyurethane polyepoxide comprising the steps:
   (a) reacting a material selected from the group consisting of polyether triols, polyester triols, and admixtures of the foregoing with polyether diols and polyester diols, said material having a hydroxyl functionality in excess of 2.3 and an average molecular weight within the range of about 1000 to about 7000, and an organic polyisocyanate, the proportion of reactants being such as to provide an excess of isocyanate groups sufficient to produce a liquid, isocyanate-terminated polyurethane prepolymer; and
   (b) reacting the prepolymer of step (a) with a reactant selected from the group consisting of hydroxy aliphatic epoxide compounds, compounds containing an active hydrogen and aliphatic unsaturation capable of undergoing epoxidation in situ, and mixtures of the foregoing with monohydric alcohols,
thereby forming a liquid polyurethane polyepoxide having a functionality in excess of 2, consisting of epoxy groups.

5. The process as defined in claim 4 further including the step of reacting said liquid polyurethane polyepoxide with an epoxy curing agent in an amount sufficient to convert said liquid to a solid, elastomeric polyurethane polyepoxide.

6. The process as defined in claim 5 wherein said curing agent is selected from the group consisting of liquid organic polyamines, polyamide polyamines, organic acids and organic acid anhydrides.

7. The polyurethane polyepoxide as defined in claim 2 in which material (a) is a mixture of a triol and an organic diol the latter having an average molecular weight of at least about 3800.

8. The polyurethane polyepoxide as defined in claim 7 in which the mixture of organic triol and diol contains at least about 60% triol hydroxyl equivalents.

9. The polyurethane polyepoxide as defined in claim 12 in which material (a) is a polypropylene ether triol having an average molecular weight of about 6100, the polyisocyanate is an 80/20% by weight mixture of 2,4- and 2,6-tolylene diisocyanates and reactant (2) is glycidol.

10. The polyurethane polyepoxide as defined in claim 1 in which reactant (2) is propylene glycol monoacrylate.

11. The polyurethane polyepoxide as defined in claim 1 in which reactant (2) is a mixture comprising isobutanol.

12. The polyurethane polyepoxide as defined in claim 1 in which material (a) is a mixture of polyester triols and polyester diols.

13. The polyurethane polyepoxide is defined in claim 12 in which said polyester mixture is a condensation product of azelaic acid, trimellitic anhydride and ricinoleyl alcohol.

14. A liquid polyurethane polyepoxide curable with an epoxy curing agent to a solid, elastomer that is the reaction product of
   (1) a polyurethane prepolymer prepared by reacting
      (a) a material selected from the group consisting of organic triols and mixtures of organic triols with organic diols, said material having a hydroxyl functionality in excess of 2.3 and an average molecular weight within the range of about 1000 to about 7000, and
      (b) an organic polyisocyanate, the proportion of reactants (a) and (b) being such as to provide an excess of isocyanate groups sufficient to produce a liquid, isocyanate-terminated polyurethane prepolymer, and
   (2) a reactant selected from the group consisting of hydroxy aliphatic epoxide compounds, compounds containing an active hydrogen and aliphatic unsaturation capable of undergoing epoxidation in situ, and admixtures of the foregoing with monohydric alcohols, said polyurethane polyepoxide having a functionality in excess of 2, consisting of epoxy groups.

15. A process for making a liquid polyurethane polyepoxide curable with an epoxy curing agent to a solid, elastomer, comprising the steps:
  (a) reacting a material selected from the group consisting of organic triols, and mixtures of organic triols with organic diols said material having a hydroxyl functionality in excess of 2.3 and an average molecular weight within the range of about 100 to about 7000, and an organic polyisocyanate, the proportion of reactants being such as to provide an excess of isocyanate groups sufficient to produce a liquid, isocyanate-terminated polyurethane prepolymer; and
  (b) reacting the prepolymer of step (a) with a reactant selected from the group consisting of hydroxy alphatic epoxide compounds, compounds containing an active hydrogen and aliphatic unsaturation capable of undergoing epoxidation in situ, and mixtures of the foregoing with monohydric alcohols, thereby forming a liquid polyurethane polyepoxide having a functionality in excess of 2, consisting of epoxy groups.

References Cited
UNITED STATES PATENTS

| | | | |
|---|---|---|---|
| 2,830,038 | 4/1958 | Pattison | 260—77.5 |
| 3,020,262 | 2/1962 | Speranza | 260—47 |

DONALD E. CZAJA, *Primary Examiner.*

MICHAEL B. FEIN, *Assistant Examiner.*

U.S. Cl. X.R.

260—2, 77.5, 348

UNITED STATES PATENT OFFICE
CERTIFICATE OF CORRECTION

Patent No. 3,445,436

May 20, 1969

Clarence L. Lake et al.

It is certified that error appears in the above identified patent and that said Letters Patent are hereby corrected as shown below:

Column 6, line 42, the claim reference numeral "12" should read -- 2 --.

Signed and sealed this 21st day of April 1970.

(SEAL)
Attest:

Edward M. Fletcher, Jr.

Attesting Officer

WILLIAM E. SCHUYLER, JR.

Commissioner of Patents